(No Model.)

C. CAREY.
PNEUMATIC TIRE.

No. 509,193. Patented Nov. 21, 1893.

Witnesses
Ernest W. Jones
Charles H. Powell

Inventor
Christopher Carey
Per Charles T. Powell
Attorney

UNITED STATES PATENT OFFICE.

CHRISTOPHER CAREY, OF BIRMINGHAM, ENGLAND.

PNEUMATIC TIRE.

SPECIFICATION forming part of Letters Patent No. 509,193, dated November 21, 1893.

Application filed May 2, 1893. Serial No. 472,805. (No model.) Patented in England March 21, 1893, No. 5,968.

*To all whom it may concern:*

Be it known that I, CHRISTOPHER CAREY, a subject of the Queen of Great Britain, and a resident of 45 Lee Crescent, Edgbaston, in the city of Birmingham, England, have invented new and useful Improvements in Wheel Pneumatic Tires, (for which I have applied for patent in Great Britain, No. 5,968, bearing date March 21, 1893,) of which the following is a specification.

This invention relates to improvements in tires for road vehicles and is more particularly intended for what are now known as cycle wheels.

My invention consists in constructing a pneumatic wheel tire with a number of separate tubular chambers in one body therewith and having a peculiar valvular connection between them as hereinafter described. These chambers I preferably form different and graduated sizes of tube so as to accommodate themselves to the shape of the tire. These chambers have air passages between them which in their normal condition act as closed valves. When air is being forced or pumped into the pneumatic tire, the air passages or valves are opened by the pressure of the inflating air. In the event of one of such chambers—for example, that chamber which is nearest to the wear and tear of the road—being punctured or damaged so as to become deprived of all or a portion of the inflating air, the escape of the inflating air from the other pneumatic chambers is prevented by the valvular arrangement, and sufficient inflation preserved in the other pneumatic chambers of the tire to enable the rider to continue his journey until the damage can be conveniently remedied.

I proceed to more particularly describe and illustrate my invention with the aid of the accompanying drawings, in which—

Figure 1:
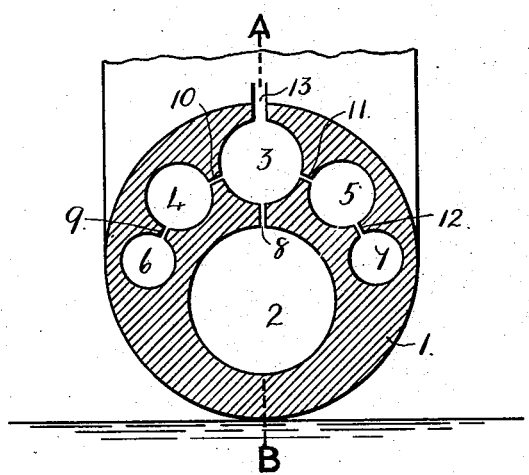
Figure 2:
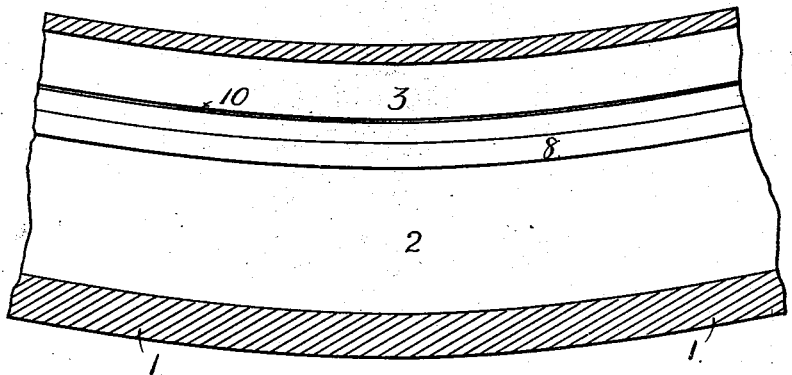

Figure 1, is a transverse section of this my invention. Fig. 2, is a side sectional view of a part of the invention on line A—B (Fig. 1).

Similar numbers refer to similar parts throughout both views.

1, is the tire. 2, 3, 4, 5, 6 and 7, are longitudinal tubular chambers which preferably run through the entire length of the tire and circumference of the wheel when in place, but need not necessarily do so but be broken at intervals by elastic material to that of which the pneumatic tire is made. Preferably the transverse sectional area of the chamber 2, is equal to all the others combined, the others being graduated in size so as to accommodate themselves to the form of the tire. At 8, 9, 10, 11 and 12, are the narrow valvular air passages or slits which—when the air is being forced in at the inlet 13—form communications from chamber 3, to chambers 2, 4 and 5, and thence from chambers 4 and 5, to chambers 6 and 7. The tendency of these slits or valves is automatically to remain closed, so that air cannot pass from one to the other without considerable force from their inlet side. Chamber 2, it will be seen is near the surface exposed to the wear and tear of the road, and therefore the only one likely to become punctured or damaged. Should this happen a portion or all of the air escapes and the hitherto distended chamber necessarily contracts or collapses, and thereby closes more firmly the valve communication 8; thus preventing the escape of the compressed air from chambers 3, 4, 5 6 and 7, by means of which sufficient inflation in the tire is preserved to enable the rider to continue his journey until the damage can be conveniently repaired.

I have here illustrated and described a tire as having six chambers because such is a convenient arrangement, but a less or greater number of chambers may be adopted as circumstances may require.

The sectional shape both of the tire and of the chambers may be modified if desired. The tire is cemented or otherwise secured or mounted upon the wheel by any of the ordinary means.

I am aware that, prior to my invention, pneumatic wheel tires have been used with inflating air under pressure also having several chambers for such air. I therefore do not claim pneumatic tires having several chambers broadly, but What I do claim as my invention, and desire to secure by Letters Patent, is—

In pneumatic wheel tires the combination with the tire 1, of the chambers 2, 3, 4, 5, 6 and 7, formed in one therewith, and having the slitted valve communications 8, 9, 10, 11 and 12, substantially as set forth and shown upon the drawings.

CHRISTOPHER CAREY.

Witnesses:
ERNST. W. JONES,
CHARLES H. POWELL.